Feb. 1, 1938. L. C. BRISSON 2,106,791
RESILIENT DIAPHRAGM
Filed Oct. 27, 1936 2 Sheets-Sheet 1
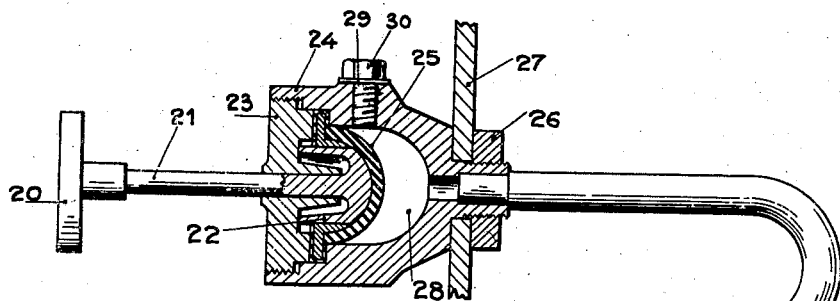
Fig.1.
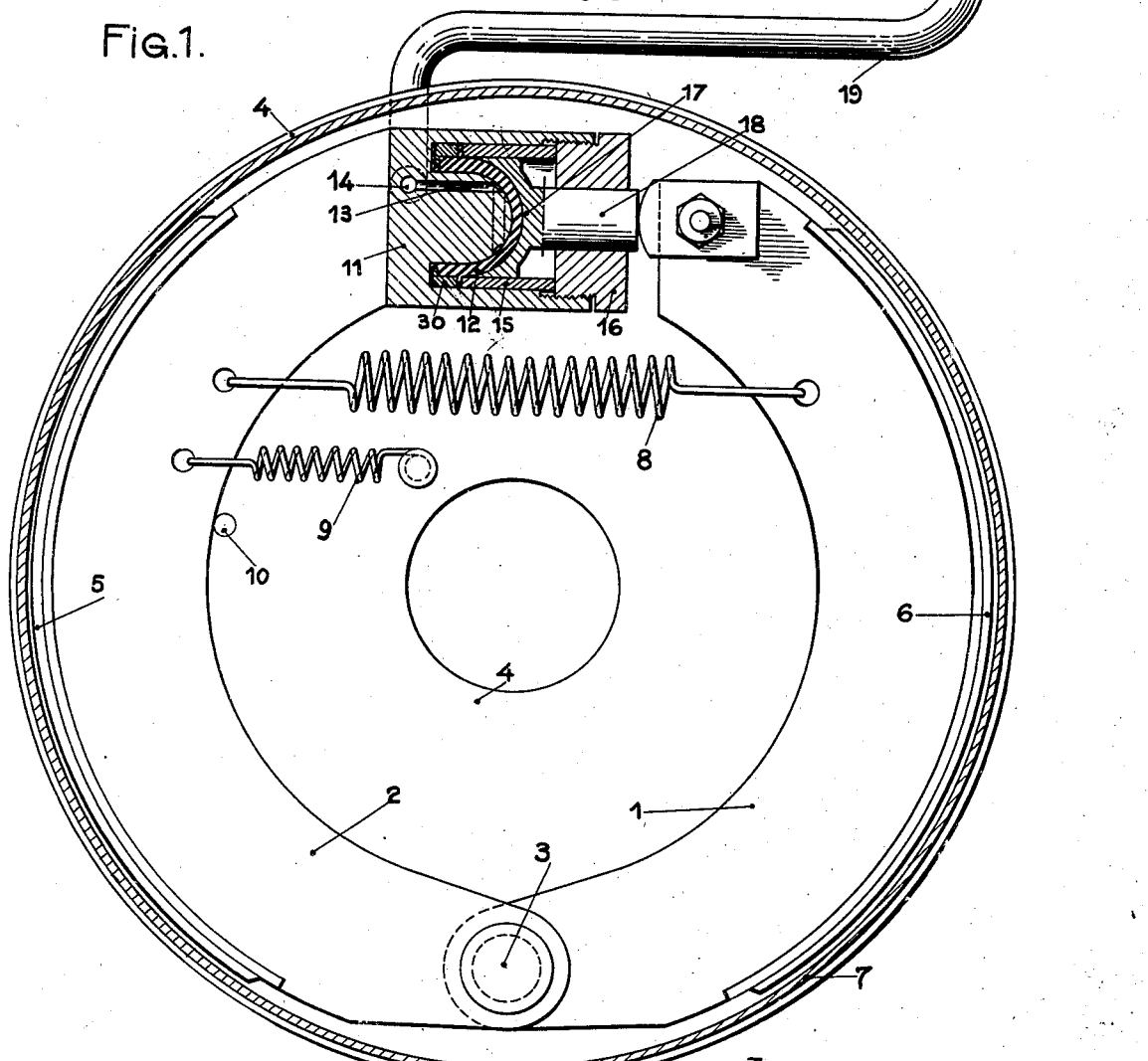
Inventor:
Louis Charles Brisson
By Haseltine, Lake & Co.
Attorneys.

Feb. 1, 1938. L. C. BRISSON 2,106,791
RESILIENT DIAPHRAGM
Filed Oct. 27, 1936 2 Sheets-Sheet 2
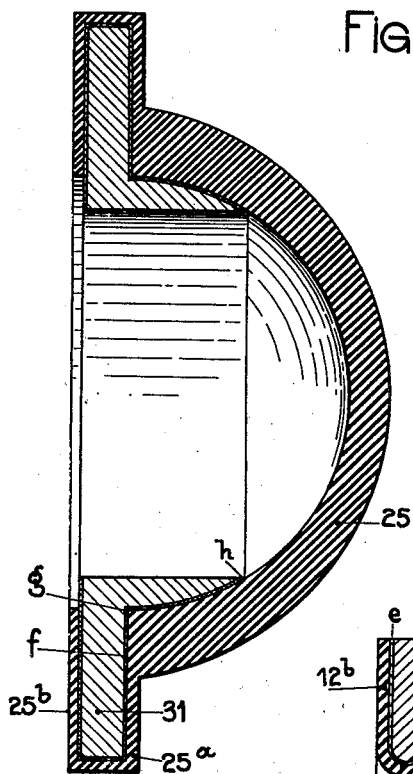
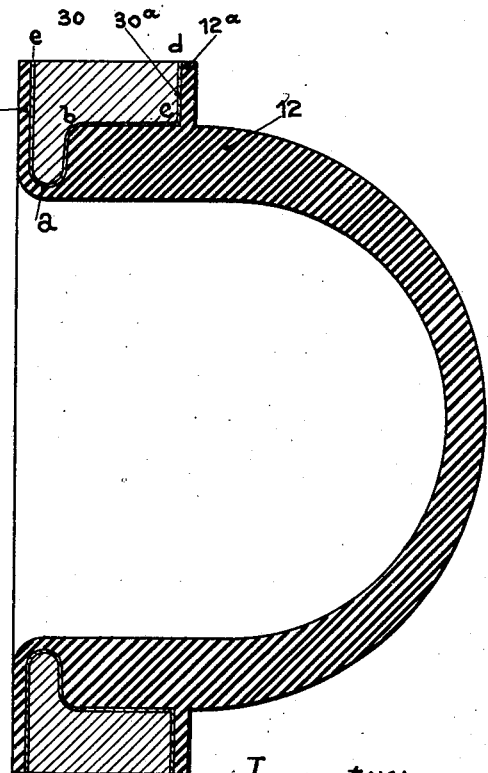
Inventor:
Louis Charles Brisson
By Haseltine, Lake & Co.
Attorneys.

Patented Feb. 1, 1938

2,106,791

UNITED STATES PATENT OFFICE 2,106,791

RESILIENT DIAPHRAGM

Louis Charles Brisson, Neuilly-sur-Seine, France, assignor to Société Anonyme: Société des Freins Hydrauliques S. de Lavaud, Paris, France Application October 27, 1936, Serial No. 107,782

1 Claim. (Cl. 60—54.6)

This invention is a development of the United States Patent application, Serial No. 63,457, filed on February 11, 1936 (now Patent No. 2,078,835), and relates to resiliently distortable diaphragms which are substantially constituted by a wall made of rubber (or material of the same kind) adapted to be clamped at its periphery between two annular surfaces, so as to ensure a partition which is fluid-tight, but movable by distortion.

Diaphragms of this kind can be divided into two categories.

The first category is characterized by the fact that the diaphragm is in the shape of a disc provided with concentric corrugations, in such a manner that the distortions of the diaphragm produce bending forces. Such diaphragms are very flexible, and, consequently, they offer only very small resistance to the forces tending to distort them. For further increasing this flexibility, the thickness of the disc is usually very small relatively to the diameter, and, moreover, use is made, for the manufacture of these discs, of very flexible and resilient rubber. Diaphragms of this class are therefore unable to withstand heavy forces.

Another category is characterized by the fact that the diaphragm is in the shape of a cap, the distortion pressure being exerted on the concave face of the cap so as to exert on the rubber elongation forces by expansion of this cap which is often, but not necessarily, of spherical shape. Such diaphragms are adapted to transmit and support very great forces, and, consequently, they are given a considerable thickness relatively to their diameter, and they are made of resistant rubber.

The two categories which have just been indicated are very different from each other in their construction and in their properties. The present invention exclusively concerns diaphragms of the second category, that is to say those constituted by a thick cap, the pressure of distortion being exerted on the concave face.

In thick diaphragms of this second category, it has been found that, after a certain time of use, the fluid-tightness of the joint between the peripheral edges of the cap, on the one hand, and the surfaces clamping this edge between them, on the other hand, was not maintained notwithstanding said edges are very powerfully clamped. A careful examination of the diaphragms in use has shown that the rubber at the peripheral edge, compressed between the clamping surfaces, seemed to have flown progressively towards the center of the diaphragm, so that the compression at the surfaces of the joint became insufficient for ensuring fluid-tightness, considering the high pressures transmitted.

It was first thought that this centripetal flow of the rubber in the peripheral portions subjected to clamping was due to the tension or elongation forces to which the diaphragm was subjected in use. Diaphragms of this kind were employed in hydraulic brakes for vehicles; when the disadvantage above mentioned, was found out, it was decided to effect experiments and trials in the laboratory. These trials have produced a surprising result, as it was impossible to obtain in the laboratory the reproduction of the phenomenon found out in service conditions, even by exaggerating the pressures transmitted by the diaphragm. From these results, it was concluded that the trials in the laboratory did not reproduce all the conditions of operation in service, and, particularly, did not take into consideration the considerable variations of temperature which occur in brakes.

The following trial was then effected: the apparatus was subjected to great changes of temperature, even without causing it to operate. After a certain time, the characteristic centripetal flow of the rubber at the place where peripheral clamping occurred was verified. It was thus clearly shown that the difficulty was produced by the variations of temperature. The explanation was then easy: when the temperature increases, the rubber expands to a great extent, as its coefficient of expansion is about fourteen times that of steel. The rubber of the peripheral portions, which is strongly compressed, can expand only towards the center. Centripetal flow takes place. But, when the temperature lowers and the rubber tends to contract, the pressure of the clamping surfaces is too great for allowing centrifugal flow of the rubber under the effect of the resiliency of the material. The molecules which have been flowing towards the center can no longer come back towards the periphery, so that the pressure clamping the edges diminishes. The centripetal flow phenomenon thus takes place over again until the clamping pressure has sufficiently diminished to allow centrifugal flow, upon contraction, to occur in its turn and to balance the centripetal flow. But then the clamping pressure is insufficient for ensuring fluid-tightness.

If this pressure is further increased by moving the clamping surfaces towards each other, fluid-tightness is momentarily re-established. But the phenomenon happens again, and, after a limited number of further tightenings, the edge portions of the rubber are damaged, and it is necessary to replace the cap.

The invention is adapted to remedy these difficulties, that is to say to preserve fluid-tightness notwithstanding the variations of temperature and to improve the life of thick diaphragms in the shape of a cap.

In the accompanying drawings:

Fig. 1 is a general view of a hydraulic brake provided with diaphragms in accordance with the invention.

Fig. 2 is a sectional view of the diaphragm employed in the pressure-transmitting device.

Fig. 3 is a sectional view of the diaphragm employed in the receiving device.

It has been easily found out that the centripetal flow of rubber under the effect of the variations of temperature was so much the smaller as the thickness of the rubber, in the peripheral clamping zone, was smaller. Therefore, it seemed that the solution of the technical problem was to be found in the diminution of this peripheral thickness of the rubber. But it is obvious that it was not possible to go very far in this direction, because the conditions of mechanical resistance obviously required a definite minimum thickness.

It was therefore necessary to find another means for retaining and supporting the peripheral edge of the rubber cap, since the problem could not be solved by clamping this edge between two surfaces. The means which has been found consists in causing the peripheral edge of the cap to adhere to the inner surface of a rigid ring, for instance made of metal, which is arranged between the two clamping surfaces. The cap is therefore no longer held in position by clamping, but only by its adherence to the inner surface of the ring, the shape and dimensions of said surface being chosen according to the forces to which the diaphragm is subjected. The metal or other rigid material constituting the ring is so chosen as to have a coefficient of expansion very slightly different from that of the members which clamp it between them.

For ensuring the adherence of the rubber to the ring, which adherence must be perfect, since it ensures the resistance to the forces to which the cap is subjected, use is made of any of the means well known in the art for obtaining complete adherence of rubber to metals. If, for instance, the ring is made of steel, the surface to which the rubber must adhere is first covered with brass, and the rubber is vulcanized on this brass-covered surface.

It has been moreover found that a large increase of the resistance is obtained by increasing the area of rubber of the diaphragm in contact with the faces of the rigid ring which are subjected to the clamping action, but making said rubber very thin. By this means, any risk of separation between the rubber and the ring is avoided, as will be explained later on.

Finally, it has further been found that much better results are obtained by giving to the ring an L cross-section, so that the rubber of the diaphragm adheres to two surfaces substantially at right angles to each other.

In the example illustrated in the drawings, the invention is applied to a brake, but it is obvious that other applications might be made, and also that the brake might be of another type.

The brake is composed of two brake-shoes 1 and 2, pivoted at 3, on a fixed plate 4. The brake-shoes 1 and 2 are provided with friction linings 5 and 6 adapted to come in contact, under the action of a device spacing them apart and which will be described later on, with a brake drum 7. A spring 8 tends to move the brake-shoes 1 and 2 towards each other, and a second spring 9 tends to press the brake-shoe 5 against a fixed abutment 10.

The device for spacing the brake-shoes apart comprises a body 11, secured to the end of the brake-shoe 5. This body receives a rubber diaphragm 12, in the shape of a cap, which can be inflated under the action of a hydraulic pressure admitted through the channels 13 and 14. The diaphragm 12, which forms the subject-matter of the invention, will be described in detail later on. The edges are clamped between the bottom of the body 11 and a ring 15, by means of a screw-threaded plug 16. The diaphragm 12 acts on a piston 17, the rod 18 of which presses against the end of the brake shoe 1.

The hydraulic pressure is supplied through a pipe 19 of a transmitting device constituted as described hereinafter. A pedal 20 is mounted at the end of the rod 21 of a piston 22, which rod 21 is guided in a corresponding bore of a screw-threaded plug 23 which is screwed in a body 24. The edges of a resilient diaphragm 25 are clamped between the plug 23 and the body 24, which is secured by a nut 26 on a fixed wall 27. The space 28 and the pipe 19 are filled with liquid through an orifice 29 subsequently closed by a plug 30. Consequently, when the pedal 20 is pressed upon, the cap 25 is distorted by elongation and a pressure is created which, being transmitted by the pipe 19 inflates the cap 12. The latter pushes the piston 18 and moves the brake-shoes 1 and 2 apart, that is to say it exerts a braking action.

The diaphragm 12, in the shape of a cap (Fig. 3) is retained by a ring 30, made of steel for instance. This ring has an L cross-section, and it is previously covered, by a well known process, with a layer of brass 30ª, in such a manner that the rubber of diaphragm 12 can intimately adhere, by vulcanization, to this ring. The force exerted by the inflation of the diaphragm upon production of the hydraulic pressure must be balanced by the adherence of the rubber to the parts $ab$ and $bc$ of the ring, that is to say on two faces substantially at right angles, one of which, $ab$, is at right angles to the force exerted on the rubber by the pressure, and the other parallel to this force. The dimensions of these faces $ab$ and $bc$ are suitably chosen for that purpose.

On the faces $cd$ and $ae$, the small thickness of rubber adhering to the ring, and which is clamped between the body 11 and socket 15, serves, on the one hand, to ensure the fluid-tightness of the joint and, on the other hand, to avoid any tendency of the rubber to become unstuck, which unsticking might occur on the faces $ab$ or $bc$, if the thin layers of rubber 12ª and 12ᵇ did not exist. In fact, it is known that the only means of separating a sheet of rubber adhering by vulcanization to a steel plate previously covered with brass, consists in trying to lift the rubber sheet by one of its edges, as is done when it is desired to remove a postage stamp from an envelope. The thin rubber layers 12ª and 12ᵇ, which are clamped between the body 11 and socket 15, therefore prevent any possibility of unsticking being initiated, and, although these thin rubber layers do not practically participate in the balancing of the forces to which the diaphragm 12 is subjected, their presence ensures a considerable increase of the resistance and life of the diaphragm.

The diaphragm 25 (Fig. 2) is constituted in a similar manner. The rubber is caused to adhere to a ring 31 having an L cross-section, the forces exerted on the rubber by the piston 22 being balanced by adherence to the faces $fg$ and $gh$. The thin rubber layers 25$^a$ and 25$^b$ fulfill the same function as the thin rubber layers 12$^a$ and 12$^b$. The only important difference between the diaphragm 12 and diaphragm 25 consists in that, in diaphragm 12, the ring 30 is an external ring, whereas in diaphragm 25, the ring 31 is an inner ring in order to fit with slight friction on piston 22.

What I claim as my invention and desire to secure by Letters Patent is:

In a device for the transmission of forces, a rubber diaphragm in the shape of a cap, the edge of which has a side surface substantially parallel to the direction of the forces transmitted and a front surface substantially at right angles to this direction, a rigid ring slightly expansible under the effect of temperature rises, having an L cross-section, and fitting on said edge by its substantially perpendicular faces, means for causing the rubber to firmly adhere to said ring at said faces, thin rubber layers integral with the rubber of the diaphragm and covering the outer faces of the ring substantially at right angles to the direction of the forces transmitted, and means for applying clamping pressure to said faces.

LOUIS CHARLES BRISSON.